April 28, 1959  L. I. DEL MATTER  2,883,783
BAIT DIPPING AND HOLDING DEVICE
Filed Feb. 5, 1957
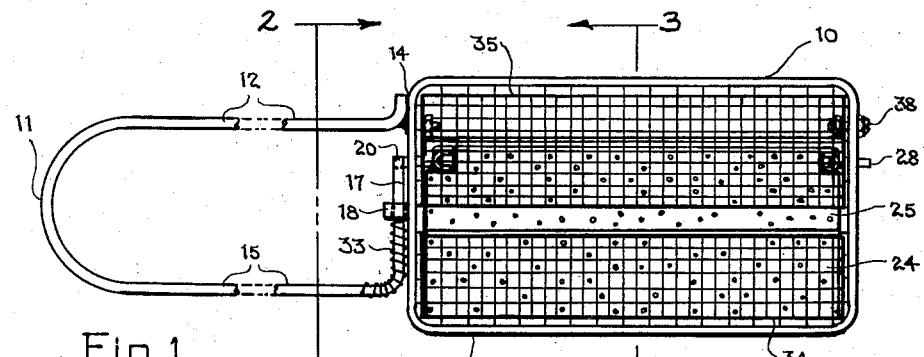
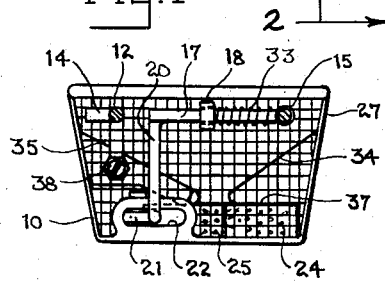
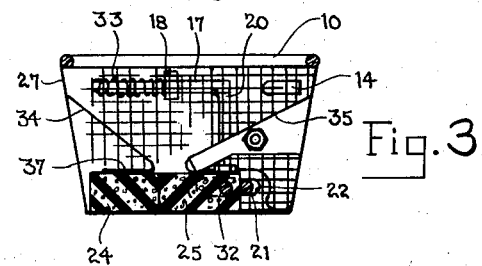
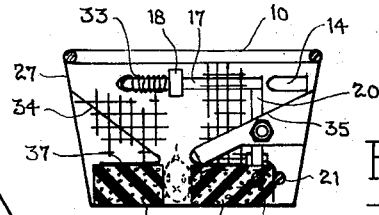
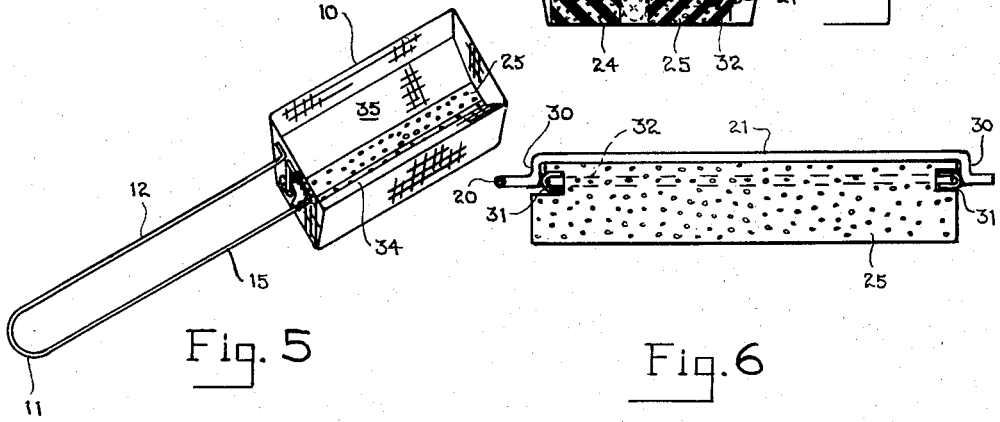
INVENTOR.
Lofton I. Del Matter
BY
Richard van H. Bruns
Attorney

United States Patent Office 2,883,783
Patented Apr. 28, 1959

2,883,783

BAIT DIPPING AND HOLDING DEVICE

Lofton I. Del Matter, East Syracuse, N.Y., assignor of fifty percent to Joseph Bellinod, Syracuse, N.Y.

Application February 5, 1957, Serial No. 638,294

6 Claims. (Cl. 43—4)

This invention relates generally to fishing equipment, and has particular reference to an improved device for dipping a minnow or the like from a container and holding same while engaging the fish hook.

For many years, the standard implement for dipping minnows from a bait bucket has been a small net or its equivalent. However, normally only one minnow can be used at a time, and it is often difficult to catch but a single minnow with a net. Moreover, after a minnow has been caught in the net, it must be grasped with the fingers and held so that the hook can be attached, and holding a slippery, wiggling minnow for this purpose is far from an easy task.

Attempts have been made in the past to eliminate the aforementioned difficulties, and various minnow dipping devices have been developed which are provided with mechanical means for holding the minnow while baiting it to the hook. With many of these devices, however, it is difficult to catch but a single minnow, as in the case of a net, and others have the disadvantage that the minnow is gripped in an injurious manner thereby diminishing its value as bait. Still others are open to the objection that they are not adapted to handle a wide size range of minnows or bait of another kind.

The primary object of the present invention, therefore, is to provide a bait dipping and holding device which is adapted to catch but a single bait and hold it in a firm yet non-injurious manner.

Another important object of the invention is to provide a bait dipping and holding device which is adapted for use with minnows having a large variation in size and also with bait of other kinds such as crawfish, shrimp, grasshoppers, and the like.

Still another important object of the invention is to provide a bait dipping and holding device which is very simple to operate and can be used if necessary by a person having only one hand.

A more specific object of the invention is to provide a bait dipping and holding device wherein the bait gripping elements are formed of compressible, resilient material so that they are conformable to bait of almost any size and shape and will not injure the same.

Other objects and advantages of the invention will become apparent from the following detailed description thereof read in conjunction with the accompanying drawings which illustrate a representative embodiment of the invention for the purpose of disclosure.

In the drawings:

Figure 1 is a top plan view of a typical bait dipping and holding device embodying the invention;

Figure 2 is a left end elevation of the receptacle of the device, this view being taken along line 2—2 of Figure 1;

Figure 3 is a transverse vertical section through the receptacle taken along line 3—3 of Figure 1;

Figure 4 is a transverse vertical section corresponding to Figure 3, showing the gripping elements in spaced apart gripping position;

Figure 5 is a reduced top perspective view of the device; and

Figure 6 is an enlarged top plan view of the movable gripping element showing in detail the manner in which it is detachably secured to the handle extension.

Having reference now to the drawings, wherein like reference numbers designate the same parts in each of the views, the bait dipping and holding device is essentially comprised of an open topped receptacle 10 and an operating handle 11 therefor. In the illustrated embodiment, receptacle 10 is in the form of a wire basket but it will be understood that plastic or any other appropriate material can be used for the receptacle and its associated parts, suitable drainage holes or perforations being formed therein.

The handle 11 for the receptacle 10 is an elongated loop of relatively heavy gauge wire, and one side 12 of this loop is fixed to one end of the receptacle at 14 as by spot welding. The other side 15 of the loop is not rigidly secured to the receptacle, the inner end thereof being bent parallel to the end of the receptacle to form an extension 17 which passes with a free fit through a guide loop or bracket 18 mounted on the receptacle for slidable movement relative thereto. The extension 17 of the handle projects beyond the guide 18 to a point spaced a short distance from the fixed side 12 of the handle where it is bent approximately 90° to form a downwardly extending leg 20. The leg 20 is bent inwardly adjacent the bottom of the receptacle to form a horizontally extending arm or reach 21 which passes through a slot 22 in the end of the receptacle for coaction with one of the gripping elements as will be presently described.

Positioned in the bottom of the receptacle 10 for the purpose of holding the bait while it is being hooked are a pair of gripping elements 24, 25. In accordance with the invention, these elements are preferably in the form of strips or blocks of a resilient, compressible material such as vinyl sponge rubber, and the left hand element 24, Figures 3 and 4, is stationary while the right hand element 25 is movable laterally into and out of edgewise engagement therewith. The element 24 is positioned adjacent the left side 27 of the receptacle and the element 25 is normally maintained in engagement therewith which positions it in the approximate center of the receptacle as shown in Figure 3.

Lateral movement of the gripping element 25 is actuated by the handle 11 through the horizontally extending arm 21. This arm, as mentioned above, enters the receptacle through a slot 22 in the handle end thereof. From that point the arm extends the full length of the receptacle and passes through a second slot (not shown) in the opposite end and terminates at 28, Figure 1. Intermediate the slots, the arm is offset as at 30, Figure 6, and U-shaped brackets 31 are secured thereto in any conventional manner. These brackets engage the opposite sides of each end of a rod 32 extending longitudinally through the gripping element 25 so that the element is operably connected to the arm but may be easily disengaged therefrom by simply forcing the rod 32 upwardly to release its ends from the brackets, the trough member above the gripping element having first been removed in the manner described hereinafter.

With the above described arrangement, movement of the free side 15 of the handle towards the fixed side 12 operates through the extension 17, downwardly extending leg 20 and horizontally extending arm 21 to move the right hand gripping element 25 out of engagement with the left hand element as shown in Figure 4. This movement acts against the bias of a spring in engagement with the handle, which spring normally holds the free side 15 thereof away from the fixed side and thus holds the two gripping elements in edgewise engagement. The spring can be a compression spring 33 fixed at one end to the free side of the handle and abutting at its other end against the guide 18 as shown.

Secured to the receptacle 10 above the gripping elements 24, 25 are a pair of inclined trough forming members 34, 35 which are formed of metallic wire in the embodiment shown but could also be made of plastic. The inner edges of these members terminate adjacent the confronting edges of the elements 24, 25 when the latter are in spaced apart position as shown in Figure 4, the members being turned back on themselves at these edges to form horizontal extensions 37 overlying the gripping elements. The extensions 37 thus serve to retain the gripping elements in position in the receptacle, and the right hand extension also serves as an upper guide surface during lateral movement of the gripping element 25.

The right hand trough member 35 is detachably secured to the receptacle as by screws 38, Figures 1 and 2, so that it can be removed to provide access to the gripping element 25 in the event that the sponge material should become worn and need to be replaced. After the right hand element 25 has been removed by detaching the rod 32 from the brackets 31, the left hand element 24 can be removed by simply pulling it to the right until it is clear of its overlying trough extension 37.

The operation of the above described device is as follows: The device is dipped in the minnow bucket or pool and then is brought up beneath a minnow (or other bait) to catch it in the receptacle 10. During this operation, the handle 11 is squeezed by manual pressure to separate the gripping elements 24, 25, and a minnow is guided by the inclined trough members 34, 35 into the space between the elements at the bottom of the receptacle. The pressure on the handle is thereafter relaxed and the spring 33 urges the movable element 25 back towards the stationary element 24 causing the minnow to be firmly gripped therebetween. The hook can then be applied to the minnow in the usual manner without the necessity of touching it with the hands at any time. After the minnow has been hooked, handle 11 is again squeezed to separate the gripping elements and the hooked minnow can be removed from the receptacle by means of the fishing line.

Since normally only one minnow can occupy the space between the separated gripping elements, any additional minnows caught in the receptacle will not be engaged by the elements and can be returned to the minnow bucket by simply overturning the receptacle. The gripping elements, however, will retain the minnow that is positioned therebetween so that it is a simple task to retain but a single minnow in the device. It should also be noted that since the gripping elements are formed of compressible sponge material they tend to conform to the bait regardless of its size or shape and hold it in a firm but non-injurious manner.

The device can be used to great advantage by handicapped fisherman (of which there are a surprisingly large number) who have only one hand or arm because after the minnow has been caught between the gripping elements, the device can be held between the knees or laid in the lap while the hook is being applied and the elements hold the minnow perfectly still. Even non-handicapped fisherman can realize a great saving in time and expense in using the device because it virtually eliminates the possibility of dropping and losing minnows as is so often the case when they must be held in the fingers during engagement of the hook. The bait dipping and holding device, when made in a larger size, is also useful to State conservation departments and fish hatcheries for handling one fingerling at a time, or for treating and tagging small fish in general.

From the foregoing description, it will be apparent that the present invention provides a practical and highly useful bait dipping and holding device which eliminates many of the difficulties encountered in similar constructions developed heretofore. The invention may be embodied in other specific forms without departing from the spirit or essential characteristics thereof. The embodiment disclosed is therefore to be considered in all respects as illustrative and not restrictive, the scope of the invention being indicated by the appended claims.

What is claimed is:

1. In a bait dipping and holding device, a foraminous receptacle having an open top, a pair of gripping elements formed of resilient compressible material mounted in said receptacle, one of said elements being stationary and the other of said elements being laterally movable into and out of edgewise engagement with the stationary element, a pair of spaced trough members mounted in said receptacle in overlying relation to said gripping elements, and a handle for said receptacle, a portion of said handle being operably connected to said laterally movable gripping element to actuate same.

2. In a bait dipping and holding device, a foraminous receptacle having an open top, a pair of gripping elements positioned in said receptacle, said elements comprising blocks of resilient compressible material, one of said elements being stationary and the other of said elements being laterally movable into and out of engagement with the stationary element, said movable element normally being positioned in edgewise engagement with said stationary element but being movable to a position spaced apart therefrom, a pair of inclined spaced trough members projecting inwardly from the sides of said receptacle above said gripping elements, the inner edges of said trough members terminating adjacent the confronting edges of said gripping elements when the latter are in spaced apart relation, and a handle for said receptacle, a portion of said handle being operably connected to said laterally movable gripping element to move it out of engagement with said stationary gripping element upon the application of pressure to the handle.

3. In a bait dipping and holding device, a foraminous receptacle having an open top, a pair of gripping elements comprising blocks of resilient compressible material, said gripping elements normally being positioned in said receptacle in abutting relation to one another, one of said gripping elements being laterally movable to a position spaced apart from the other gripping element, a pair of inclined spaced trough members projecting inwardly from the sides of said receptacle above said gripping elements, the inner edges of said trough members terminating adjacent the confronting edges of said gripping elements when the latter are in spaced apart relation, and a loop shaped handle for said receptacle, one end of said handle being fixed to said receptacle and the other end thereof being free, said free end extending into the interior of said receptacle and being operably connected to said movable gripping element to actuate same upon the application of pressure to the handle.

4. In a bait dipping and holding device, a substantially rectangular foraminous receptacle having an open top, a pair of gripping elements comprising strips of compressible sponge material, said gripping elements being positioned on the bottom of said receptacle and normally being in edgewise engagement with one another, one of said gripping elements being laterally movable over the bottom of said receptacle out of edgewise engagement with the other element to a position spaced apart therefrom, a pair of inclined spaced trough members of foraminous material projecting inwardly from the sides of said receptacle above said gripping elements, the inner edges of said trough members terminating adjacent the confronting edges of said gripping elements when the latter are in spaced apart relation, and a handle for said receptacle in the form of a horizontally disposed elongated loop, one side of said handle being fixed to the receptacle, and guide means on said receptacle, the other side of said handle being slidably mounted in said guide means for movement towards or away from the fixed side of the handle, said slidable handle side having an extension passing into the interior of said receptacle and operably connected to said movable gripping element whereby movement of said slidable handle side towards said fixed handle side shifts said movable gripping element out of engagement with said other gripping element.

5. Structure as defined in claim 4 wherein said movable gripping element is detachably secured to said handle extension.

6. Structure as defined in claim 4 together with spring means coacting with said guide means and slidable handle side to bias the latter away from the fixed handle side whereby the two gripping elements are urged into engagement with one another.

References Cited in the file of this patent

UNITED STATES PATENTS

| | | |
|---|---|---|
| 2,480,924 | Heger | Sept. 6, 1949 |
| 2,611,982 | Sears | Sept. 30, 1952 |
| 2,617,678 | Kelso | Nov. 11, 1952 |

FOREIGN PATENTS

| | | |
|---|---|---|
| 256,393 | Great Britain | Aug. 12, 1926 |